United States Patent
Staubach et al.

(10) Patent No.: US 11,920,872 B2
(45) Date of Patent: *Mar. 5, 2024

(54) GAS TURBINE ENGINE HEAT EXCHANGER FOR ANNULAR FLOWPATHS

(71) Applicant: RTX Corporation, Farmington, CT (US)

(72) Inventors: Joseph B. Staubach, Colchester, CT (US); Amanda Jean Learned Boucher, Cambridge, MA (US); Jesse M. Chandler, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,655

(22) Filed: Jun. 30, 2022

(65) Prior Publication Data

US 2022/0349656 A1   Nov. 3, 2022

Related U.S. Application Data

(63) Continuation of application No. 16/733,646, filed on Jan. 3, 2020, now Pat. No. 11,378,341.

(51) Int. Cl.
  *F28D 7/00* (2006.01)
  *F01K 23/06* (2006.01)
  (Continued)

(52) U.S. Cl.
  CPC .............. *F28D 7/005* (2013.01); *F01K 23/06* (2013.01); *F01K 25/103* (2013.01); *F02C 1/05* (2013.01);
  (Continued)

(58) Field of Classification Search
  CPC .......... F28D 1/047; F28D 1/0472; F28D 7/04; F28D 7/024; F28D 7/005; F28D 7/1669;
  (Continued)

(56) References Cited

U.S. PATENT DOCUMENTS

| 2,435,557 | A | * | 2/1948 | Eyre | ........................ F28D 7/04 60/39.83 |
| 5,097,896 | A | * | 3/1992 | Belcher | .................... F28D 7/08 165/173 |

(Continued)

FOREIGN PATENT DOCUMENTS

| GB | 2519147 A | 4/2015 |
| GB | 2521113 A | 6/2015 |
| GB | 2521114 A | 6/2015 |

OTHER PUBLICATIONS

European Search Report dated May 17, 2021 for European Patent Application No. 20216218.6.

(Continued)

*Primary Examiner* — Mark A Laurenzi
*Assistant Examiner* — Xiaoting Hu
(74) *Attorney, Agent, or Firm* — Bachman & LaPointe, P.C.

(57) ABSTRACT

A heat exchanger has arcuate inlet and outlet manifolds and a plurality of tube banks, each tube bank coupling one of the inlet manifold outlets to an associated one of the outlet manifold inlets. Each tube bank partially nests with one or more others of the tube banks and has: a first header coupled to the associated inlet manifold outlet and the associated the outlet manifold inlet; a second header; and a plurality of tube bundles each having a first end coupled to the associated first header and a second end coupled to the associated second header. A flowpath from the each inlet manifold outlet passes sequentially through flowpath legs formed by each of the tube bundles in the associated tube bank to exit the tube bank to the associated outlet manifold inlet.

20 Claims, 15 Drawing Sheets

(51) Int. Cl.
*F01K 25/10* (2006.01)
*F02C 1/05* (2006.01)
*F02C 7/16* (2006.01)
*F28D 7/04* (2006.01)
*F28D 21/00* (2006.01)

(52) U.S. Cl.
CPC .................. *F02C 7/16* (2013.01); *F28D 7/04* (2013.01); *F28D 2021/0021* (2013.01); *F28D 2021/0026* (2013.01)

(58) Field of Classification Search
CPC ........... F28D 7/1676; F28D 2021/0021; F28D 2021/0026; F01K 7/32; F01K 25/103; F01K 23/06; F01K 23/10; F02C 1/04; F02C 1/05; F02C 1/10; F02C 1/105; F02C 7/08; F02C 7/10; F02C 7/224; F02C 7/14; F02C 7/141; F02C 7/143; F02C 7/16; F02C 7/18
See application file for complete search history.

(56) References Cited

U.S. PATENT DOCUMENTS

| | | | |
|---|---|---|---|
| 6,115,919 A | 9/2000 | Oswald et al. | |
| 7,775,031 B2 | 8/2010 | Wood | |
| 7,946,806 B2 | 5/2011 | Murphy | |
| 8,387,362 B2 | 3/2013 | Storage et al. | |
| 9,200,855 B2 | 12/2015 | Kington et al. | |
| 9,249,730 B2 | 2/2016 | Bourassa et al. | |
| 9,623,723 B2 | 4/2017 | Pomme | |
| 9,764,435 B2 | 9/2017 | Morris et al. | |
| 9,766,019 B2 | 9/2017 | Eleftheriou et al. | |
| 9,777,963 B2 | 10/2017 | Martinez et al. | |
| 9,945,251 B2 | 4/2018 | Yeager et al. | |
| 10,094,284 B2 | 10/2018 | Cordova et al. | |
| 10,126,062 B2 | 11/2018 | Cerny et al. | |
| 10,184,400 B2 | 1/2019 | Cerny et al. | |
| 10,358,976 B2 | 7/2019 | Jagtap | |
| 10,443,436 B2 | 10/2019 | Miller et al. | |
| 2011/0088405 A1 | 4/2011 | Turco | |
| 2012/0243970 A1* | 9/2012 | Hellgren | F01D 5/187 415/178 |
| 2015/0101334 A1* | 4/2015 | Bond | F28D 7/08 165/82 |
| 2017/0044980 A1 | 2/2017 | Duesler et al. | |
| 2017/0044983 A1 | 2/2017 | Duesler et al. | |
| 2017/0198974 A1* | 7/2017 | Cerny | F28D 1/047 |
| 2017/0205157 A1 | 7/2017 | Stieber | |
| 2017/0268426 A1 | 9/2017 | Duesler et al. | |
| 2018/0003076 A1* | 1/2018 | Miller | F01D 5/187 415/178 |
| 2019/0024987 A1 | 1/2019 | Moore et al. | |
| 2019/0170445 A1 | 6/2019 | McCaffrey | |
| 2019/0170455 A1 | 6/2019 | McCaffrey | |
| 2019/0204012 A1 | 7/2019 | Army et al. | |
| 2019/0212074 A1 | 7/2019 | Lockwood et al. | |

OTHER PUBLICATIONS

Zhiqiang Cao et al., "Study on the Influence of Tube Curvature on Heat Transfer Characteristics of High Efficiency Air Pre-cooler", Aug. 2019, IOP Conference Series: Materials Science and Engineering, 677, IOP Publishing, Bristol, United Kingdom.

\* cited by examiner

GAS TURBINE ENGINE HEAT EXCHANGER FOR ANNULAR FLOWPATHS

CROSS-REFERENCE TO RELATED APPLICATION

This is a continuation of U.S. patent application Ser. No. 16/733,646, filed Jan. 3, 2020, and entitled "Gas Turbine Engine Heat Exchanger for Annular Flowpaths", the disclosure of which is incorporated by reference herein in its entirety as if set forth at length.

BACKGROUND

The disclosure relates to gas turbine engine heat exchangers. More particularly, the disclosure relates to heat exchangers for annular spaces.

Gas turbine engines (used in propulsion and power applications and broadly inclusive of turbojets, turboprops, turbofans, turboshafts, industrial gas turbines, and the like) include a variety of heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer heat from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

Among recently proposed annular heat exchangers are those in United States Patent Application Publication 20150101334A1 (the '334 publication), Bond et al., Apr. 16, 2015, "HEAT EXCHANGERS" and U.S. Pat. No. 10,184,400 (the '400 patent), Cerny et al., Jan. 22, 2019, "Methods of cooling a fluid using an annular heat exchanger".

SUMMARY

One aspect of the disclosure involves a heat exchanger comprising: an arcuate inlet manifold having: at least one inlet; and a plurality of outlets; an arcuate outlet manifold having: at least one outlet; and a plurality of inlets; and a plurality of tube banks. Each tube bank couples one of the inlet manifold outlets to an associated one of the outlet manifold inlets. Each of the tube banks partially nests with one or more others of the tube banks. Each of the tube banks comprises: a first header coupled to the associated inlet manifold outlet and the associated the outlet manifold inlet; a second header; and a plurality of tube bundles. Each tube bundle has a first end coupled to the associated first header and a second end coupled to the associated second header, with a flowpath from the associated inlet manifold outlet passing sequentially through flowpath legs formed by each of the tube bundles in the associated tube bank to exit the tube bank to the associated outlet manifold inlet.

A further embodiment of any of the foregoing embodiments may additionally and/or alternatively include each first header comprising: a first end coupled to the associated inlet manifold outlet; a second end coupled to the associated outlet manifold inlet; at least one dividing wall between an upstream end of one said leg and a downstream end of the next adjacent downstream leg; and each second header comprises: a closed first end; a closed second end; and at least one dividing wall between a downstream end of one said leg and an upstream end of the next adjacent upstream leg.

A further embodiment of any of the foregoing embodiments may additionally and/or alternatively include each tube bank comprising a plurality of modules. Each module comprises: a first header segment and a second header segment and first and second tube bundles. The first header segment has: an inlet end; an outlet end; and a barrier between the inlet end and the outlet end and separating an inlet plenum from an outlet plenum. The second header segment has: a closed first end; and a closed second end. The first the tube bundle extends between the inlet plenum and the second header segment. The second tube bundle extends between the second header segment and the outlet plenum. The first header segments are secured end-to-end to form the first header. The second header segments are secured end-to-end to form the second header.

A further embodiment of any of the foregoing embodiments may additionally and/or alternatively include: each said first header segment inlet end and outlet end being flanged; adjacent first segment header flanges being secured to each other via band clamps; each said second header segment first end and second end being flanged; and adjacent second segment header flanges being secured to each other via band clamps.

A further embodiment of any of the foregoing embodiments may additionally and/or alternatively include: a first tie ring structurally connecting first ends of the second headers of the tube banks; and a second tie ring structurally connecting second ends of the second headers of the tube banks.

A further embodiment of any of the foregoing embodiments may additionally and/or alternatively include the arcuate inlet manifold, arcuate outlet manifold, and plurality of tube banks each consisting essentially of nickel-based superalloy.

A further embodiment of any of the foregoing embodiments may additionally and/or alternatively include the arcuate inlet manifold and arcuate outlet manifold each being continuously curving.

A further embodiment of any of the foregoing embodiments may additionally and/or alternatively include the arcuate inlet manifold and arcuate outlet manifold extending at least 300° about a central axis.

A further embodiment of any of the foregoing embodiments may additionally and/or alternatively include the arcuate inlet manifold and arcuate outlet manifold extending 300° to 360° about a central axis.

A further embodiment of any of the foregoing embodiments may additionally and/or alternatively include the arcuate inlet manifold and arcuate outlet manifold tapering in transverse internal cross section away from the respective inlet manifold inlet and outlet manifold outlet.

A further embodiment of any of the foregoing embodiments may additionally and/or alternatively include the plurality of tube banks being at least 4 tube banks.

A further embodiment of any of the foregoing embodiments may additionally and/or alternatively include the plurality of tube banks being 20 to 60 tube banks.

A further embodiment of any of the foregoing embodiments may additionally and/or alternatively include each of the tube banks nesting with at least four others of the tube banks.

A further embodiment of any of the foregoing embodiments may additionally and/or alternatively include each of the tube banks circumferentially partially or completely overlapping at least four others of the tube banks.

A further embodiment of any of the foregoing embodiments may additionally and/or alternatively include each of the tube banks circumferentially overlapping at least four others of the tube banks at a given circumferential location.

A further embodiment of any of the foregoing embodiments may additionally and/or alternatively include each of the tube banks comprising at least four said tube bundles.

A further embodiment of any of the foregoing embodiments may additionally and/or alternatively include each of the tube banks comprising four to eight said tube bundles.

A further embodiment of any of the foregoing embodiments may additionally and/or alternatively include each of the tube bundles comprising at least 20 tubes.

A further embodiment of any of the foregoing embodiments may additionally and/or alternatively include the tubes in each of the tube bundles being arranged in a two dimensional array.

A further embodiment of any of the foregoing embodiments may additionally and/or alternatively include the tubes of the tube banks being arcuate.

A further embodiment of any of the foregoing embodiments may additionally and/or alternatively include the tubes of the tube banks being continuously curving arcuate.

A further embodiment of any of the foregoing embodiments may additionally and/or alternatively include the tubes of the tube banks being of circular cross-section.

A further embodiment of any of the foregoing embodiments may additionally and/or alternatively include a turbine engine including the heat exchanger and further comprising a gas path passing combustion gas across exteriors of the tube banks.

A further embodiment of any of the foregoing embodiments may additionally and/or alternatively include the turbine engine further comprising a recuperator comprising: a turbine coupled to the at least one outlet of the outlet manifold; and a compressor having an outlet coupled to the at least one inlet of the inlet manifold.

A further embodiment of any of the foregoing embodiments may additionally and/or alternatively include the recuperator comprising a generator driven by the turbine.

A further embodiment of any of the foregoing embodiments may additionally and/or alternatively include the recuperator comprising a supercritical carbon dioxide or other cryogenic working fluid.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 13A is an enlarged view of an outlet end of the header of FIG. 13.

Like reference numbers and designations in the various drawings indicate like elements.

DETAILED DESCRIPTION

Figure 1:
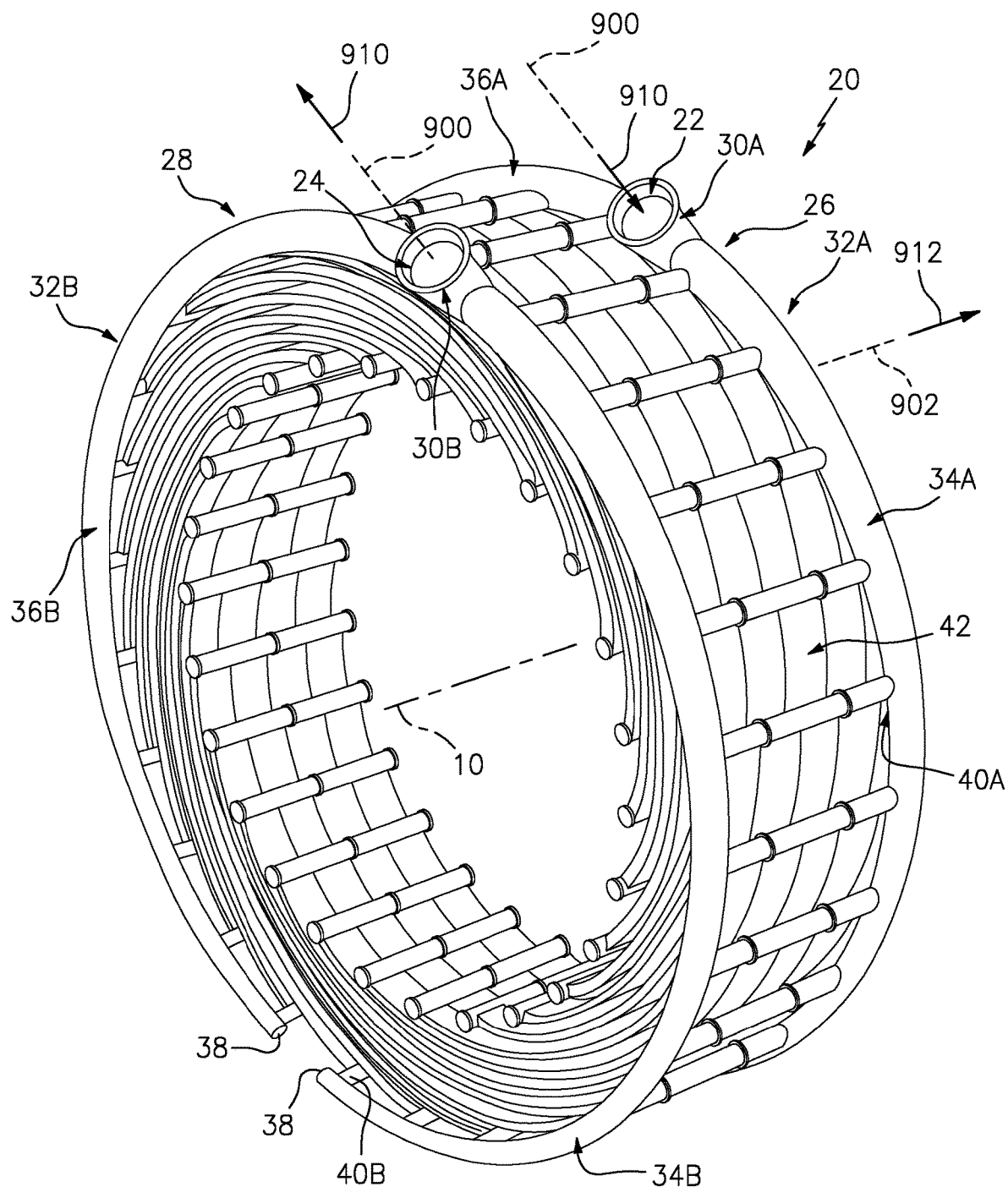
FIG. 1 is a view of an annular heat exchanger for heat exchange between a first flow and an annular second flow.

FIG. 1 shows a heat exchanger 20 providing heat exchange between a first flowpath 900 and a second flowpath 902 and thus between their respective first and second fluid flows 910 and 912. In the exemplary embodiment, the flowpaths 900, 902 are gas flowpaths passing respective gas flows 910, 912. In the illustrated example, the first flow 910 enters and exits the heat exchanger 20 as a single piped flow and the flow 912 is an axial annular flow surrounding a central longitudinal axis 10 of the heat exchanger.

The heat exchanger 20 has a first flow inlet 22 and a first flow outlet 24. The exemplary inlet and outlet are, respectively, ports of an inlet manifold 26 and an outlet manifold 28. Exemplary manifolds are metallic (e.g., nickel-based superalloy). The inlet manifold and outlet manifold may each have a respective fitting 30A, 30B providing the associated port 22, 24. Each manifold 26, 28 further has a body 32A, 32B extending circumferentially about the axis 10 from the associated fitting 30A, 30B, and port 22, 24. The exemplary manifolds have continuously curving arcuate form.

In the exemplary embodiment, each body 32A, 32B extends in two branches or arms, with a first branch 34A, 34B extending in one circumferential direction and a second branch 36A, 36B extending in the other. Each branch 34A, 34B, 36A, 36B extends to a terminal end 38. In the illustrated example, the terminal ends 38 of the branches of a given manifold 26, 28 are spaced apart from each other by a small angular increment (e.g., up to about 20 degrees, more narrowly, 5 to 20 degrees or 5 to 10 degrees) so that the manifold nearly fully circumscribes the axis 10. More broadly, each manifold may circumscribe an exemplary at least 300 degrees about the axis 10.

As is discussed in further detail below, each branch 34A, 34B, 36A, 36B progressively decreases in internal transverse cross-sectional area from the associated fitting 30A, 30B to the associated end 38. An exemplary such decrease or taper is at least 50% from the port 40A, 40B closest to a given fitting 30A, 30B to the port 40A, 40B furthest away on the same branch. This taper helps provide uniform conditions among the ports 40A and, separately, among the ports 40B to provide uniform conditions among the different tube banks 42.

In the illustrated example, therefore, the first flow 910 and associated flowpath 900 initially split in two forming branch flows and flowpaths in the respective branches 34A and 36A. Ultimately, they similarly merge in the outlet manifold 28 from respective flow and flowpath branches associated with the outlet manifold branches 34B, 36B. In between the inlet manifold and outlet manifold, the first flow further branches in several stages. A first further branching involves exiting the inlet manifold via a circumferentially distributed plurality of outlets 40A, ultimately returning to the outlet manifold via a similarly distributed plurality of inlets 40B. Between each inlet manifold outlet 40A and its respective associated outlet manifold inlet 40B, the respective flowpath branch carries its respective branch flow through an associated tube bank 42.

Figure 2:
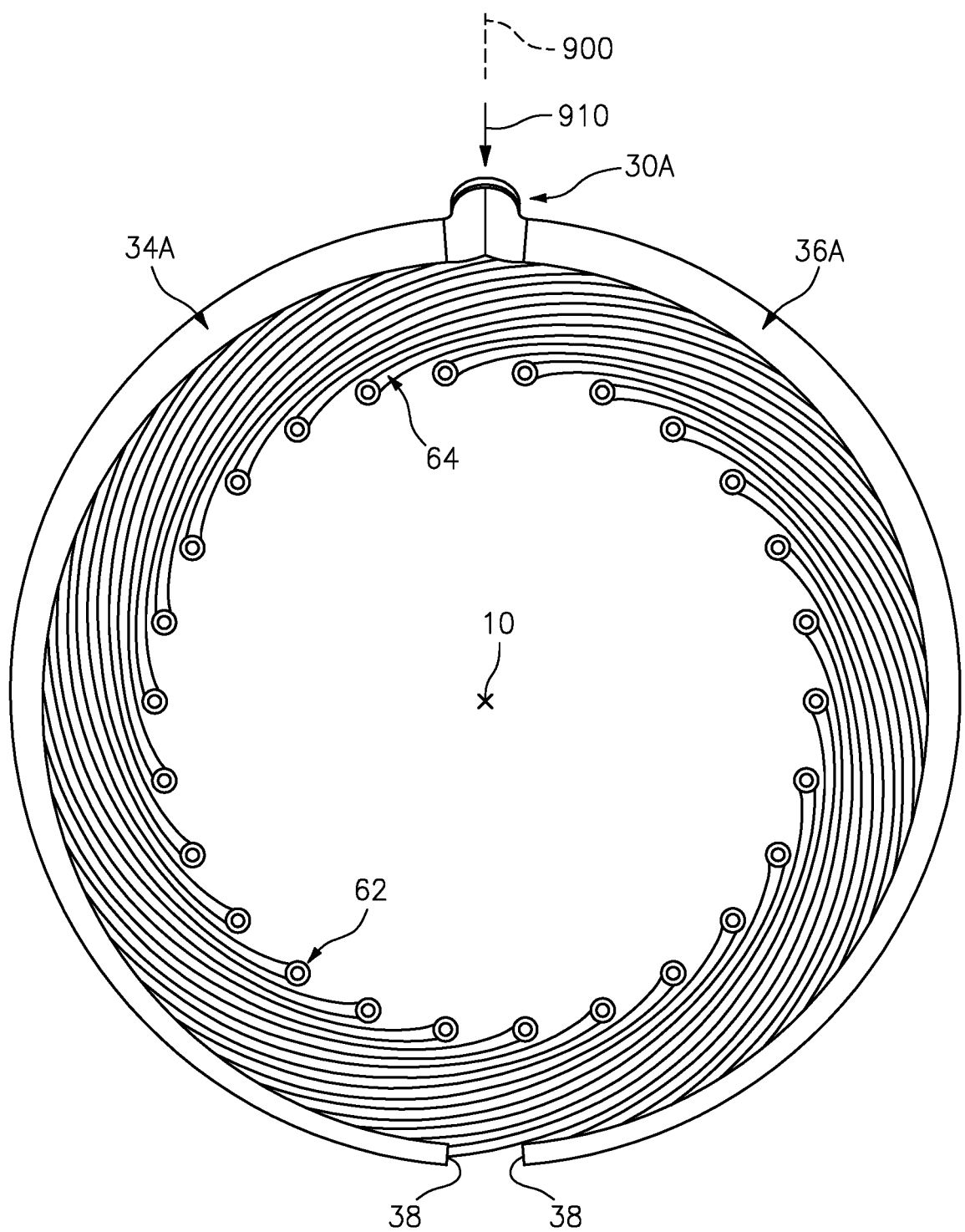
FIG. 2 is a downstream end view along the second flowpath of the heat exchanger of FIG. 1.
Figure 3:
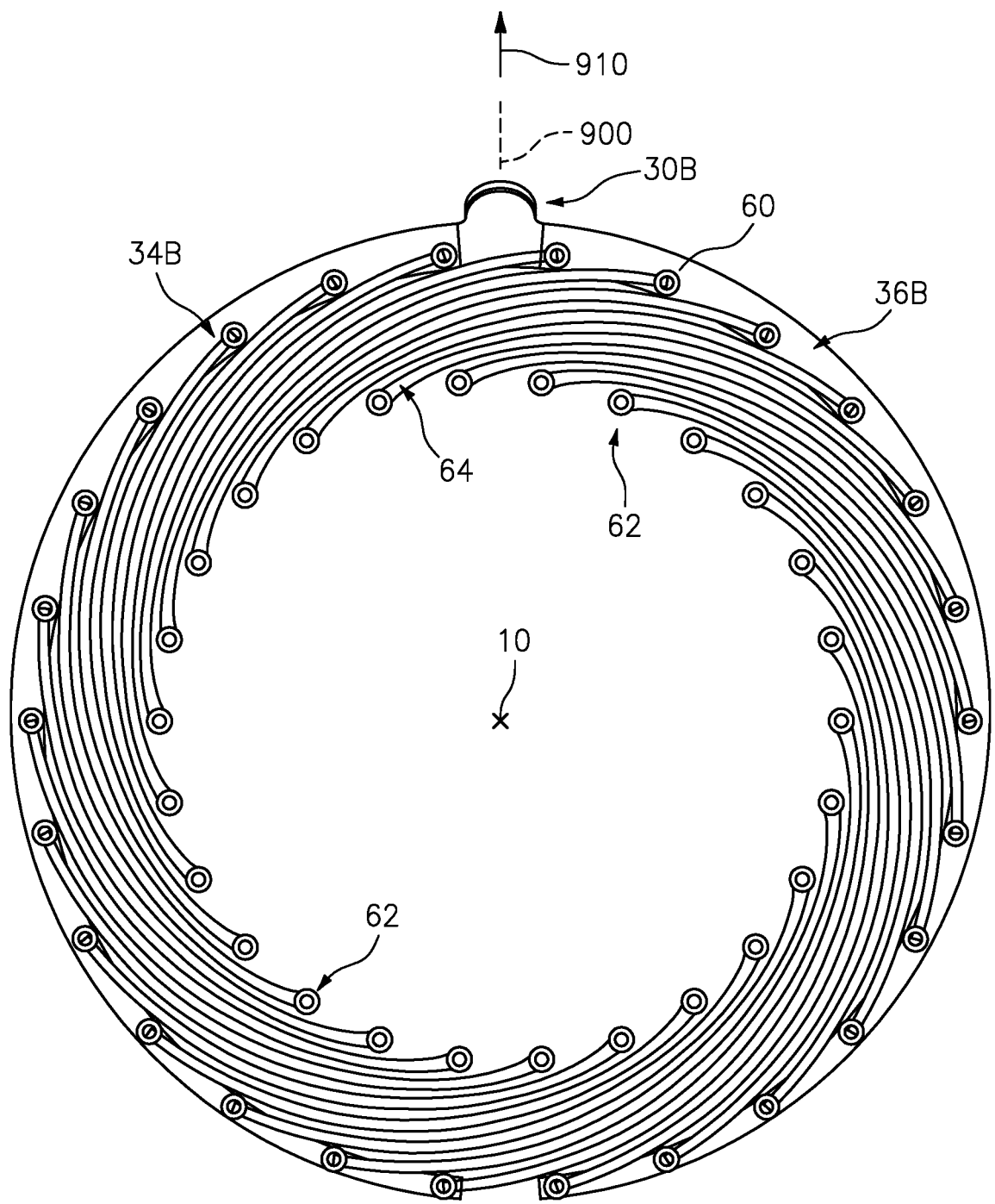
FIG. 3 is a view of the heat exchanger of FIG. 2 with a downstream end manifold removed for illustration.
Figure 4:
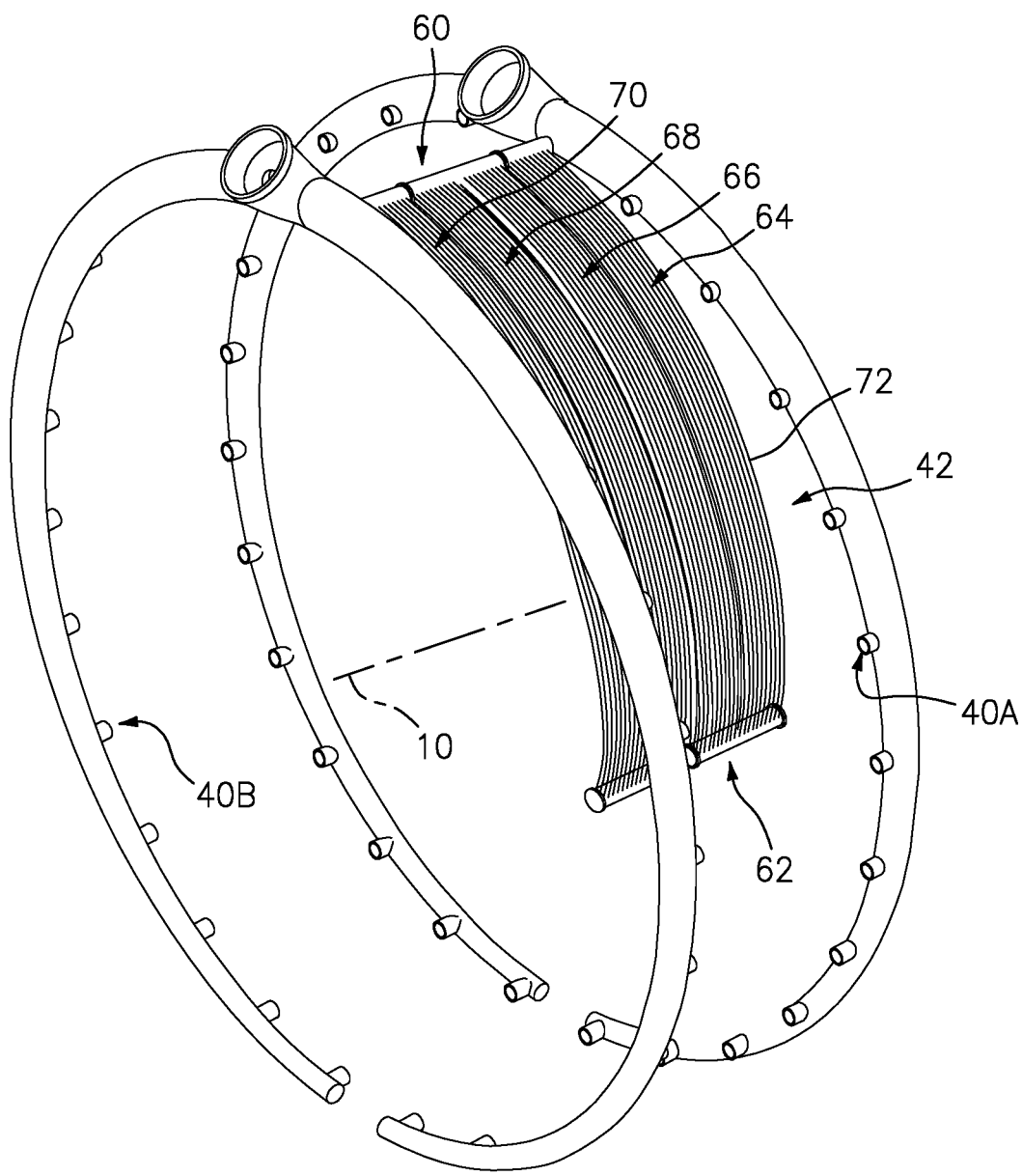
FIG. 4 is a view of the heat exchanger with all but one tube bank removed.
Figure 5:
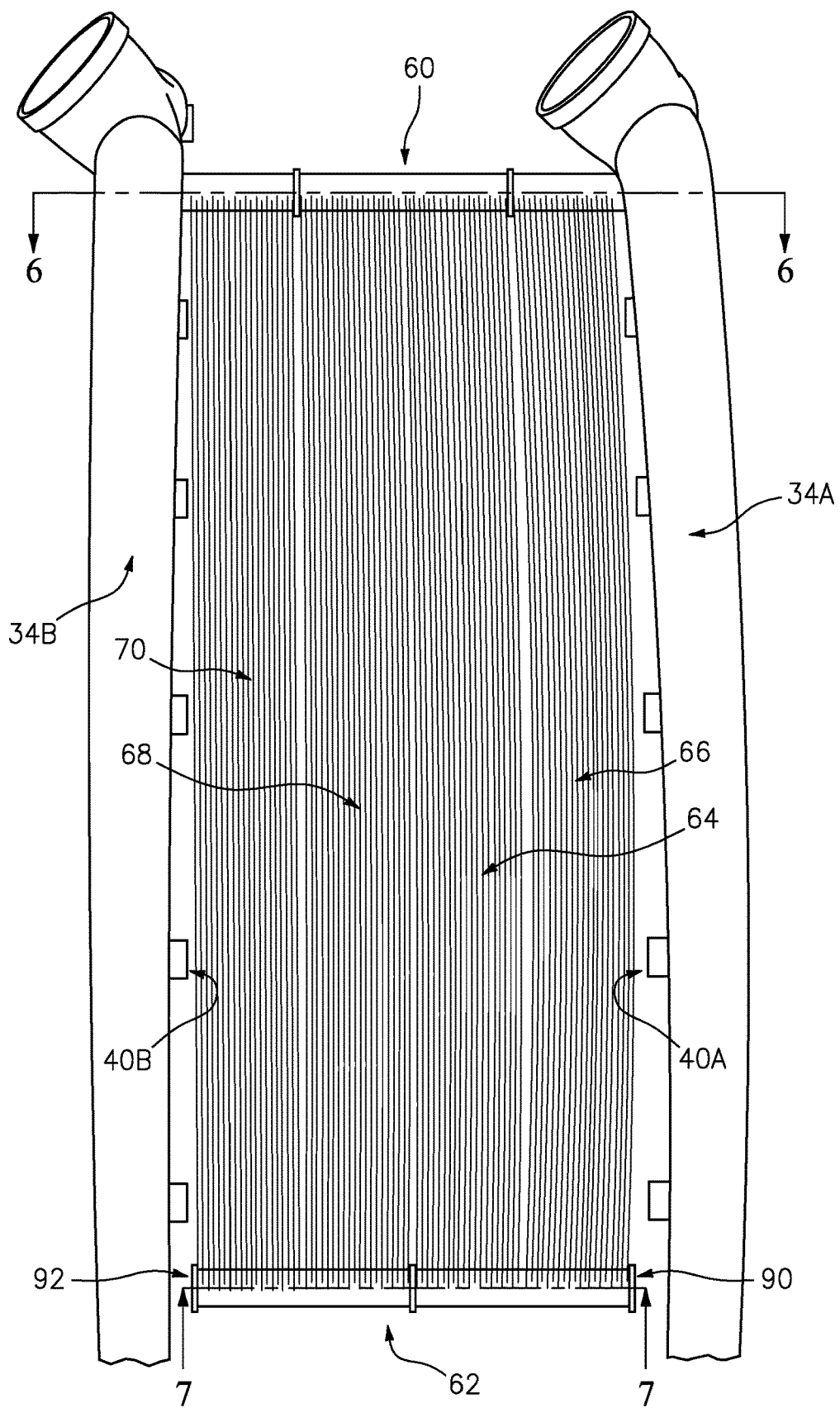
FIG. 5 is a side view of the heat exchanger of FIG. 4.

As is discussed further below, each tube bank 42 extends circumferentially and radially so as to partially nest with one or more others of the tube banks. The exemplary nesting causes each bank to overlap several others at a given circumferential location (e.g., at least 3 or at least 4, or an exemplary 4 to 8). FIG. 4 is a view of the heat exchanger 20 showing only a single tube bank 42 for purposes of illustration (remaining banks removed). Each tube bank 42 has a first header 60 (proximal header or inlet/outlet header) coupled to the associated inlet manifold outlet 40A and the associated outlet manifold inlet 40B. Each tube bank 42 further includes a second header 62 (distal header or turn header) circumferentially and radially offset from the first header 60. Both exemplary headers 60, 62 extend axially parallel to the axis 10. Each tube bank 42 includes an axially arrayed series of tube bundles 64, 66, 68, 70. Each tube bundle includes a plurality of tubes 72. Each tube bundle and its associated tubes has a first end at the first header 66 and a second end at the second header 62. To facilitate the nesting, each tube bank and its associated tubes has an arcuate form (FIGS. 2 and 3).

Figure 6:
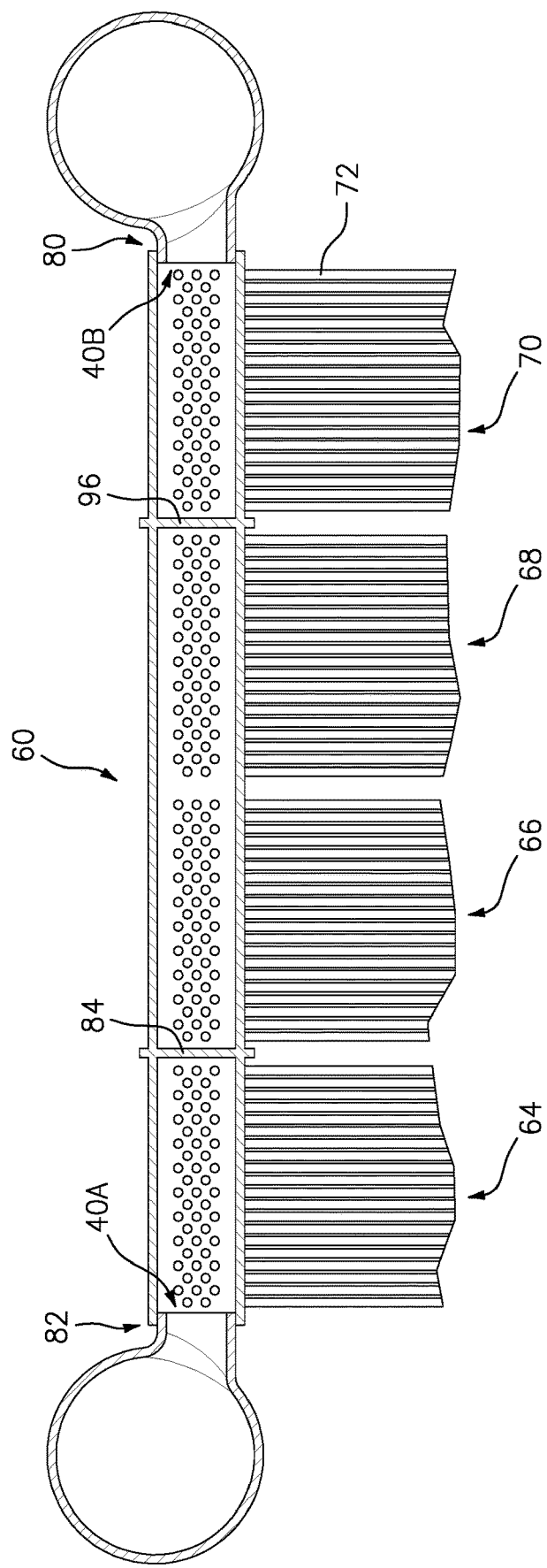
FIG. 6 is a cross-sectional view of a first header of the tube bank taken along line 6-6 of FIG. 5.

FIG. 6 shows the first header 60 as having a first end 80 at the associated manifold outlet 40A and a second end 82 at the associated manifold inlet 40B. Exemplary manifold outlets 40A and inlets 40B are formed as rims of bosses protruding from the tube structure of the associated branch 34A, 36A, 34B, 36B. The ends 80, 82 may be butt welded thereto or may be received in such bosses or may receive such bosses (shown) and similarly be welded, brazed, or otherwise secured (optionally including via fittings (not shown)).

Each exemplary header 60, 62 is formed of tubular metal stock (e.g., a nickel-based superalloy) with holes (e.g., drilled holes) mating with (e.g., receiving ends of) the associated tubes 72. Each header may be segmented as discussed below.

The second header 62 similarly extends from a first end 90 to a second end 92. These exemplary ends are closed.

So that the first flow flowpath (flowpath branch) through a given tube bank may pass from the associated inlet manifold outlet 40A sequentially through flowpath legs formed by each of the tube bundles 64, 66, 68, and 70 and exit the tube bank to the associated outlet manifold inlet 40B, each header 60, 62 includes one or more dividing walls 84, 86, 94 to create turns in the header. The dividing walls may be formed as plates welded between ends of associated header tubular segments. Similar plates may form the closed ends 90, 92. Thus, the flow branch within each first header 60 first travels circumferentially within the flowpath leg formed by the tube bundle 64; then, in the second header 62 turns axially to pass circumferentially back through the flowpath leg formed by the tube bundle 66; then again turns in the first header 60 to pass circumferentially in the flowpath leg formed by the tube bundle 68; and finally turns to head back circumferentially in the flowpath leg formed by the bundle 70 to then exit the first header 60 and enter the associated outlet manifold inlet 40B.

With the flow 912 passing in the FIG. 1 direction, sequentially encountering the tube bundles 70, 68, 66, and 64 there is effectively a stepwise counter-flow effect. Within each leg (four exemplary bundles and associated legs per illustrated bank), the heat exchange is cross-flow but the axial arraying of the legs creates the counter-flow effect. More broadly, an exemplary number of bundles and legs per bank is 4 to 8 or 2 to 16. An exemplary number of banks is the illustrated 26, more broadly 20 to 40 or 20 to 60.

Figure 7:
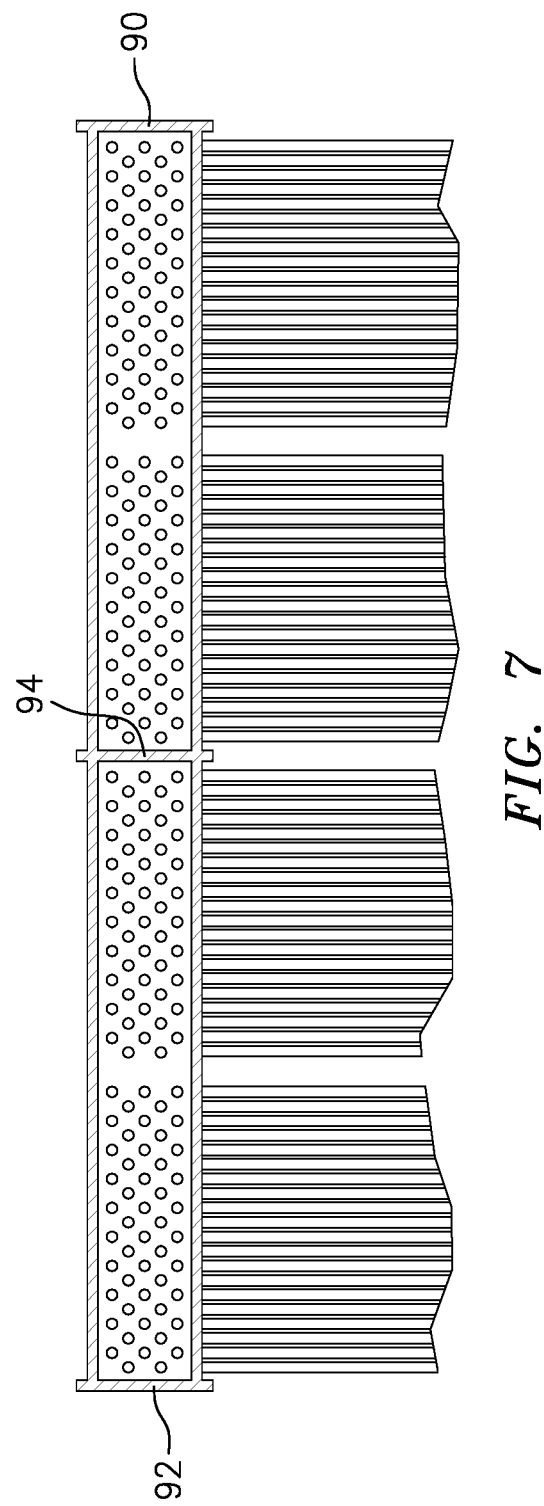
FIG. 7 is a cross-sectional view of a second header of the tube bank taken along line 7-7 of FIG. 5.
Figure 8:
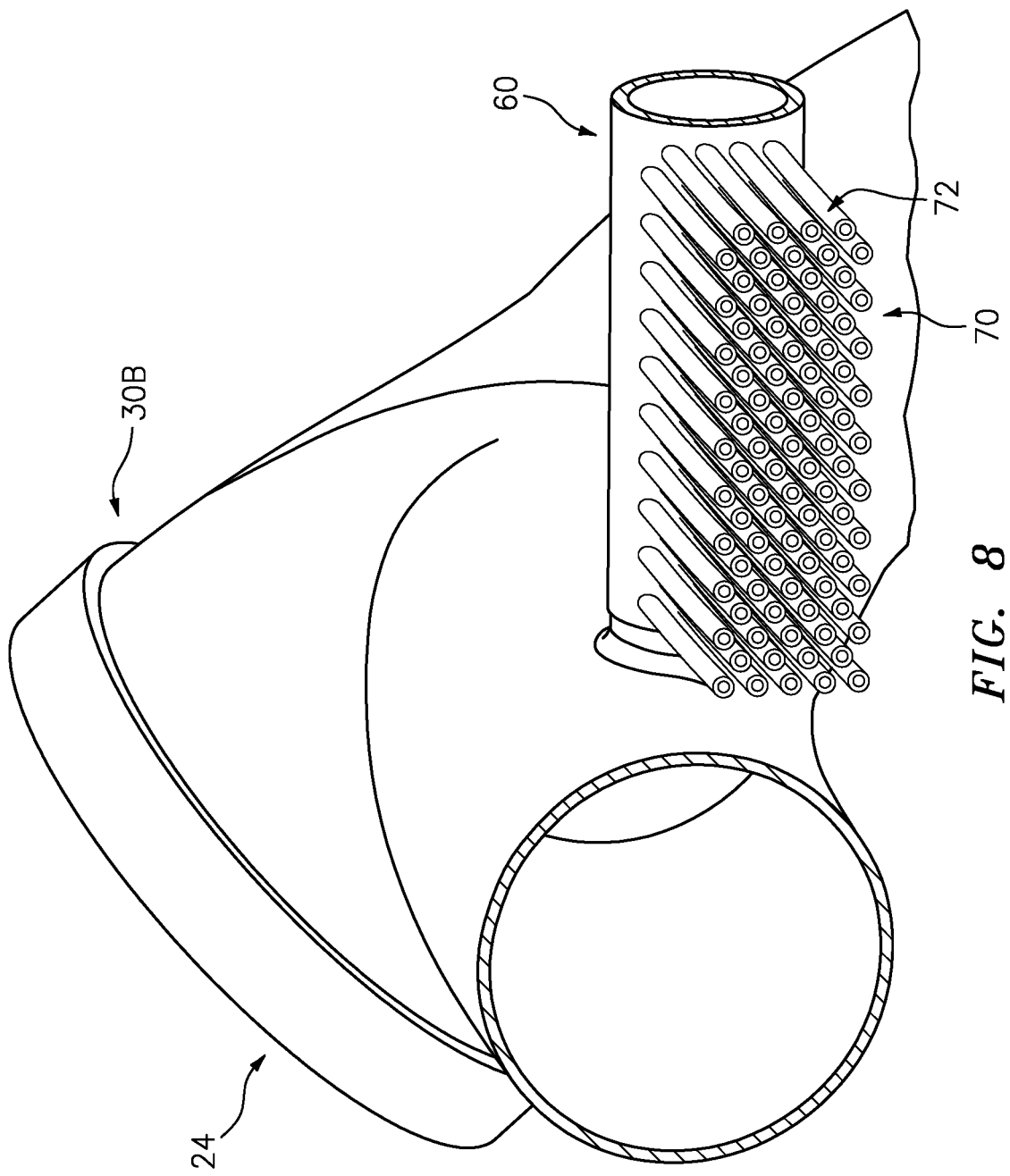
FIG. 8 is a partially cutaway view of a tube bundle, first header, and outlet manifold.

FIGS. 6 and 7 show further details of exemplary arrangements of the tubes 72 within each bundle. The exemplary tubes within each bundle are shown in a regular array (e.g., a staggered array shown with each row exactly out of phase with the next). The exemplary illustrated bundles each have forty tubes in four rows of ten with each row exactly out of phase with the adjacent row(s). A broader exemplary range of tubes per bundle is 8 to 225, more narrowly, 20 to 200 or 30 to 80.

An exemplary heat exchanger manufacture process involves forming the manifolds by casting (e.g., of nickel-based superalloy).

The tubes 72 may be formed by extrusion (e.g., of nickel-based superalloy such as Inconel 625) followed by bending to form the arcuate shape (e.g., mandrel bending) and cutting to length.

The headers may be formed by casting or extrusion.

The tubes may be secured to the headers by vacuum brazing.

The tube banks may be secured to the manifolds by brazing or welding.

An exemplary use situation is in a recuperator or waste heat recovery wherein the first flow 910 is of the recuperator working fluid (e.g., carbon dioxide). The heat exchanger 20 may be used as a heat absorption heat exchanger in the hot section of the engine (e.g., absorbing heat from combustion gases (as the second flow 912) in an exhaust duct downstream of the turbine). Alternatively, the heat exchanger may be used as a heat rejection heat exchanger (e.g., rejecting heat to air (as the second flow 912) in a fan duct or other bypass).

Figure 9:
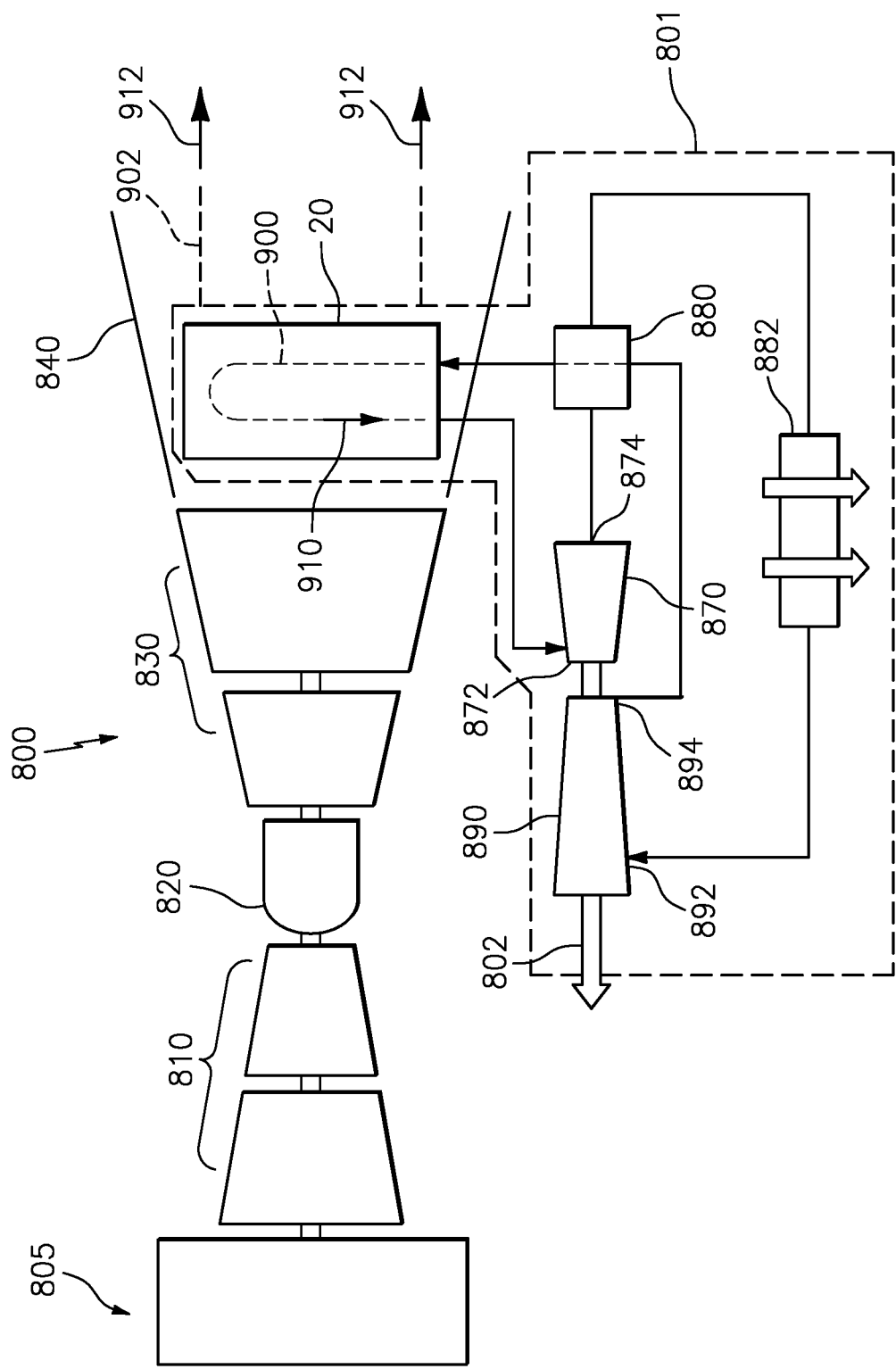
FIG. 9 is a schematic view of a gas turbine engine having the annular heat exchanger in a recuperating supercritical $CO_2$ bottoming cycle.

FIG. 9 schematically illustrates a gas turbine engine 800, including the heat exchanger 20 in a waste heat recovery system (recuperator) 801. The exemplary engine is an aircraft propulsion engine, namely a turbofan. The engine has a fan section 805, one or more compressor sections 810, a combustor section 820 and one or more turbine sections 830, sequentially along a primary fluid flowpath (core flowpath). The fan also drives air along an outboard bypass flowpath. The exemplary engine is a two-spool engine with the low spool directly or indirectly (e.g., via reduction gearbox) driving the fan. Exemplary combustors are annular combustors and can-type combustor arrays.

A downstream section of the core flowpath provides the second flowpath 902. Downstream of the turbine section 830 is an exhaust casing 840 which exhausts combustion gas (as the fluid flow 912) into an ambient atmosphere downstream of the turbine.

In order to recapture the waste heat from the combustion gas flow 912 and convert the waste heat to work, the heat exchanger 20 is positioned within the exhaust casing 840. The first flowpath 900 is a leg of a supercritical $CO_2$ ($sCO_2$) bottoming Brayton cycle (referred to herein as the waste heat recovery system 801). The heat exchanger 20 is connected to transfer heat from the turbine exhaust to the waste heat recovery system 801, and the waste heat recovery system 801 converts the heat into rotational work (which may be used for various purposes such as driving an electrical generator (not shown) to power aircraft systems). The waste heat recovery system 801 may additionally recuperate waste heat within the recovery system 801 and is referred to as a recuperating bottoming cycle.

The waste heat recovery system 801 has a turbine 870 with an inlet 872 connected to an output of the heat exchanger 20. The turbine 870 expands the heated working fluid ($CO_2$ or other cryogenic fluid 910) and expels the heated working fluid through a turbine outlet 874. The expelled working fluid is passed through a relatively hot passage of a recuperating heat exchanger 880, and is passed to a relatively hot passage of a heat rejection heat exchanger 882. The heat exchanger 882 may be positioned to reject thermal energy from the working fluid to ambient air (e.g., fan bypass air). After passing through the heat rejection heat exchanger 882, the working fluid is passed to an inlet 892 of a compressor 890. The compressor 890 (driven by the turbine 870 (e.g., co-spooled)) compresses the working fluid, and passes the compressed working fluid from a compressor outlet 894 to a cold passage of the recuperating heat exchanger 880.

During operation of the waste heat recovery system 801, the compressor 890 compresses the working fluid, and passes the compressed working fluid through the recuperating heat exchanger 880 and the heat exchanger 20, causing the compressed working fluid to be heated in each of the heat exchangers 20, 880. The heated working fluid is provided to the inlet 872 of the turbine 870 and expanded through the turbine 870, driving the turbine 870 to rotate. The rotation of the turbine 870 drives rotation of the compressor 890 and of an output shaft 802. The output shaft 802 may be mechanically connected to one, or more, additional turbine engine systems and provides work to those systems using any conventional means for transmitting rotational work. Additionally or alternatively, the rotational work can be converted into electricity and used to power one or more engine or aircraft systems using a conventional electrical generator system coupled to the output shaft.

Figure 10:
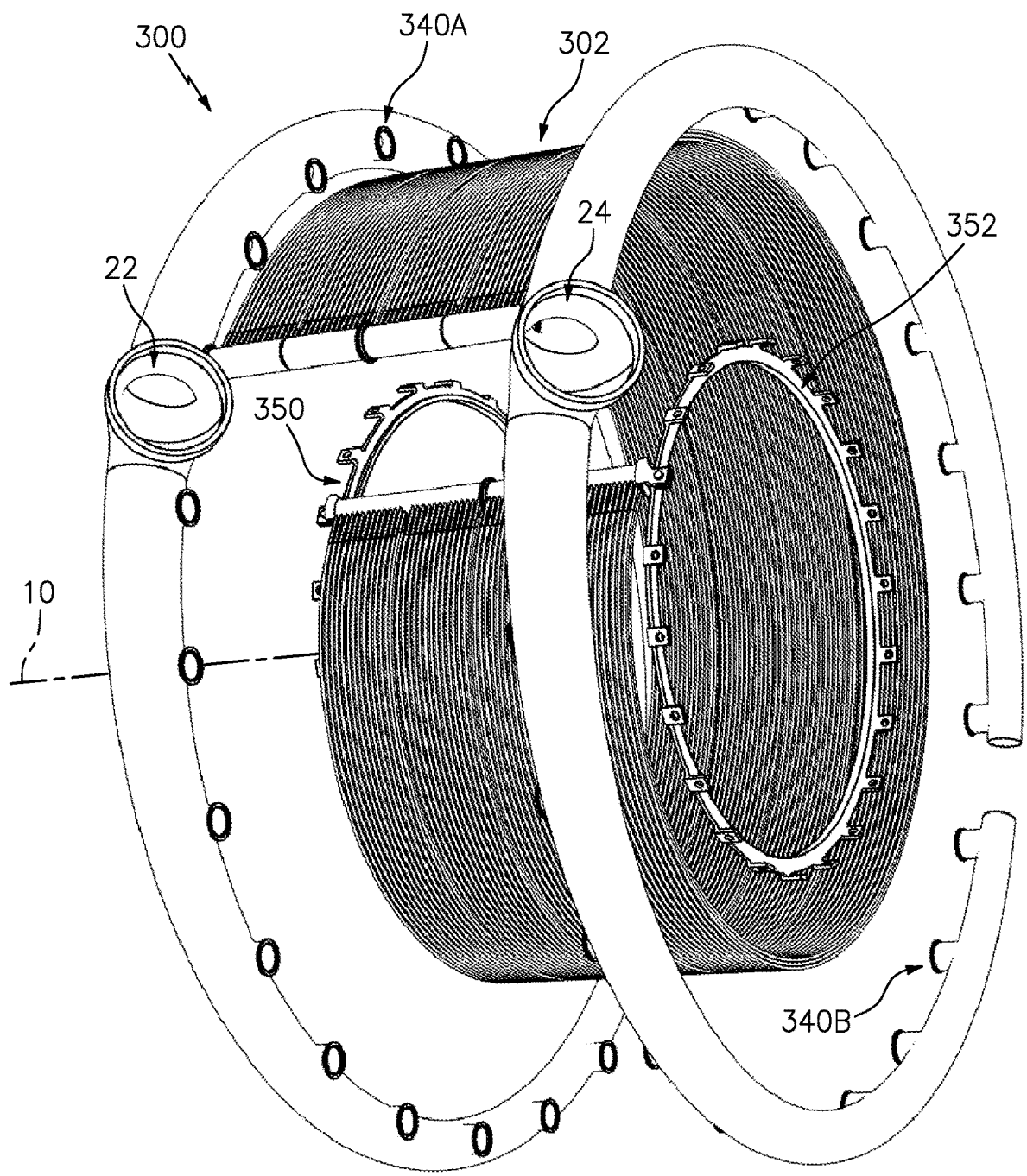
FIG. 10 is a first view of an alternate heat exchanger with all but one tube bank removed.
Figure 11:
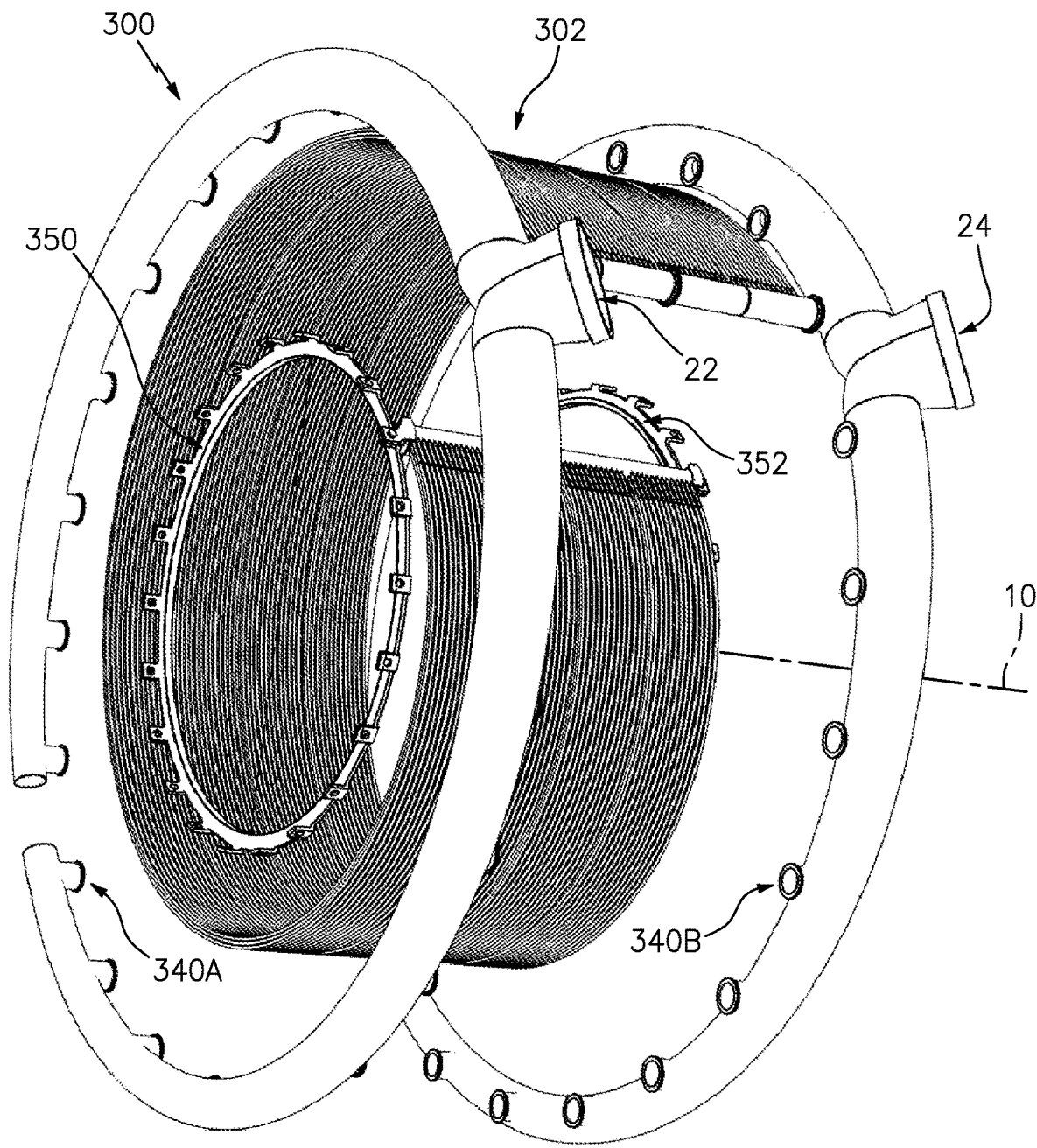
FIG. 11 is a second view of the alternate heat exchanger with all but one tube bank removed.

FIG. 10 shows an alternate heat exchanger 300 otherwise similar to the heat exchanger 20 with the main exception of each tube bank 302 wrapping close to a full 360° about the axis 10. Given this amount of wrapping, the count of tube banks is lower than that of the heat exchanger 20 (e.g., an exemplary twenty-two tube banks in the illustrated configuration). Additionally, the FIGS. 10-15 show details of a clamped flange attachment of headers to manifolds and of header segments to each other. Such attachments may also be used on the heat exchanger 20. FIGS. 10-15 also show details of tie rings 350 structurally holding distal ends of the tube banks together. Such tie rings may also be used on the heat exchanger 20.

Figure 12:
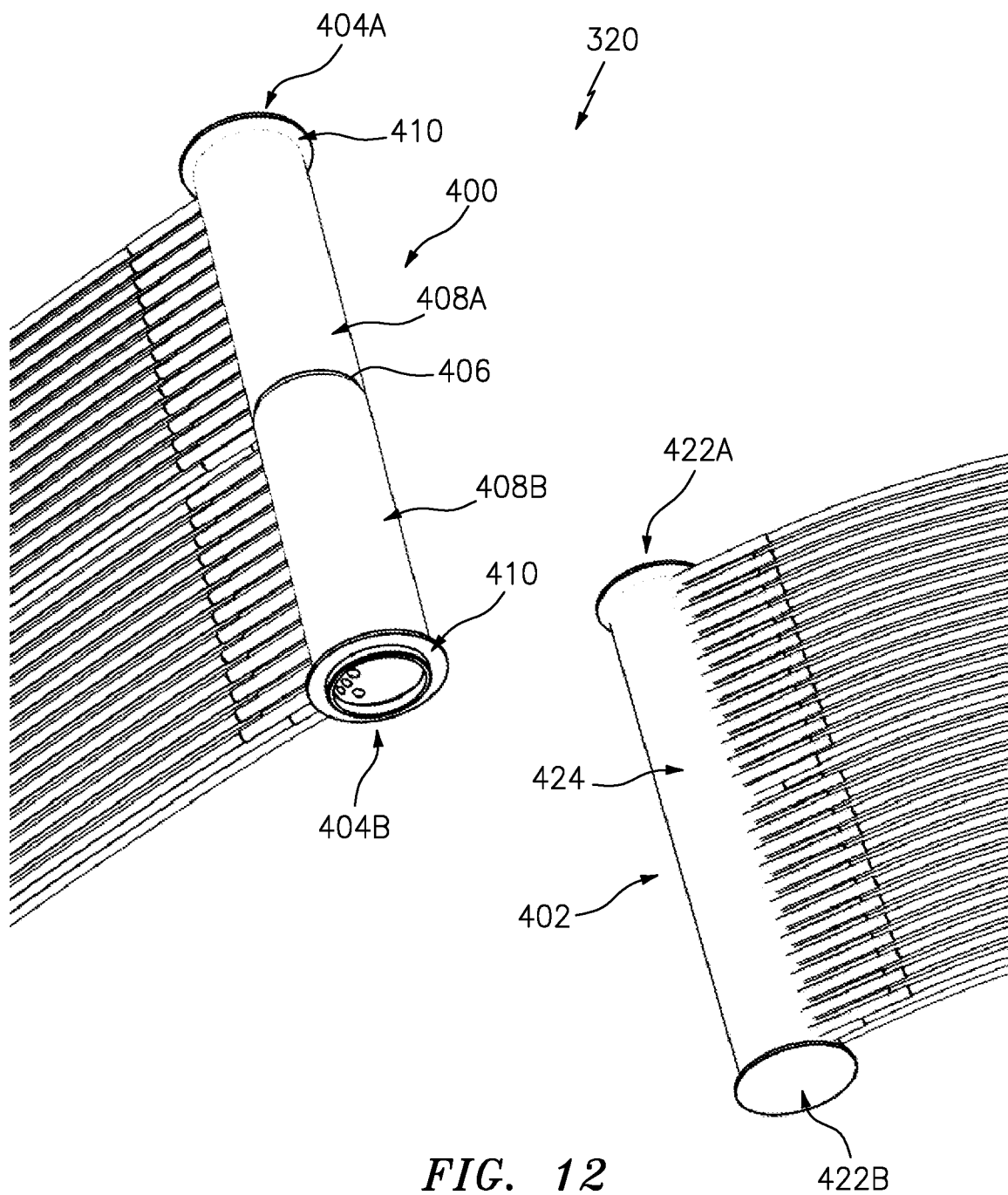
FIG. 12 is a cutaway view of a two-bundle tube set of the alternate heat exchanger of FIGS. 10 and 11.
Figure 13:
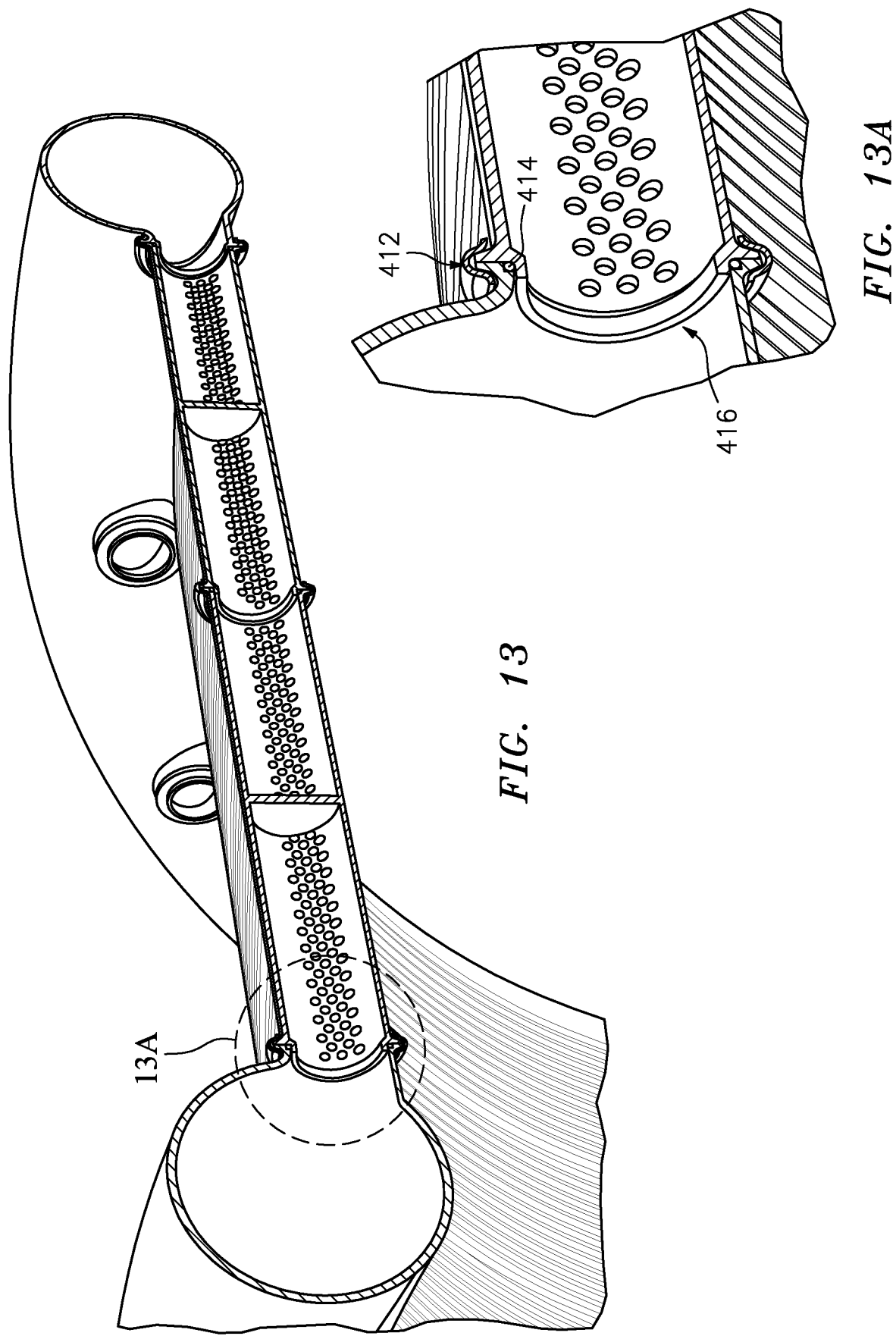
FIG. 13 is a cutaway view of a first header of the alternate heat exchanger.
Figure 14:
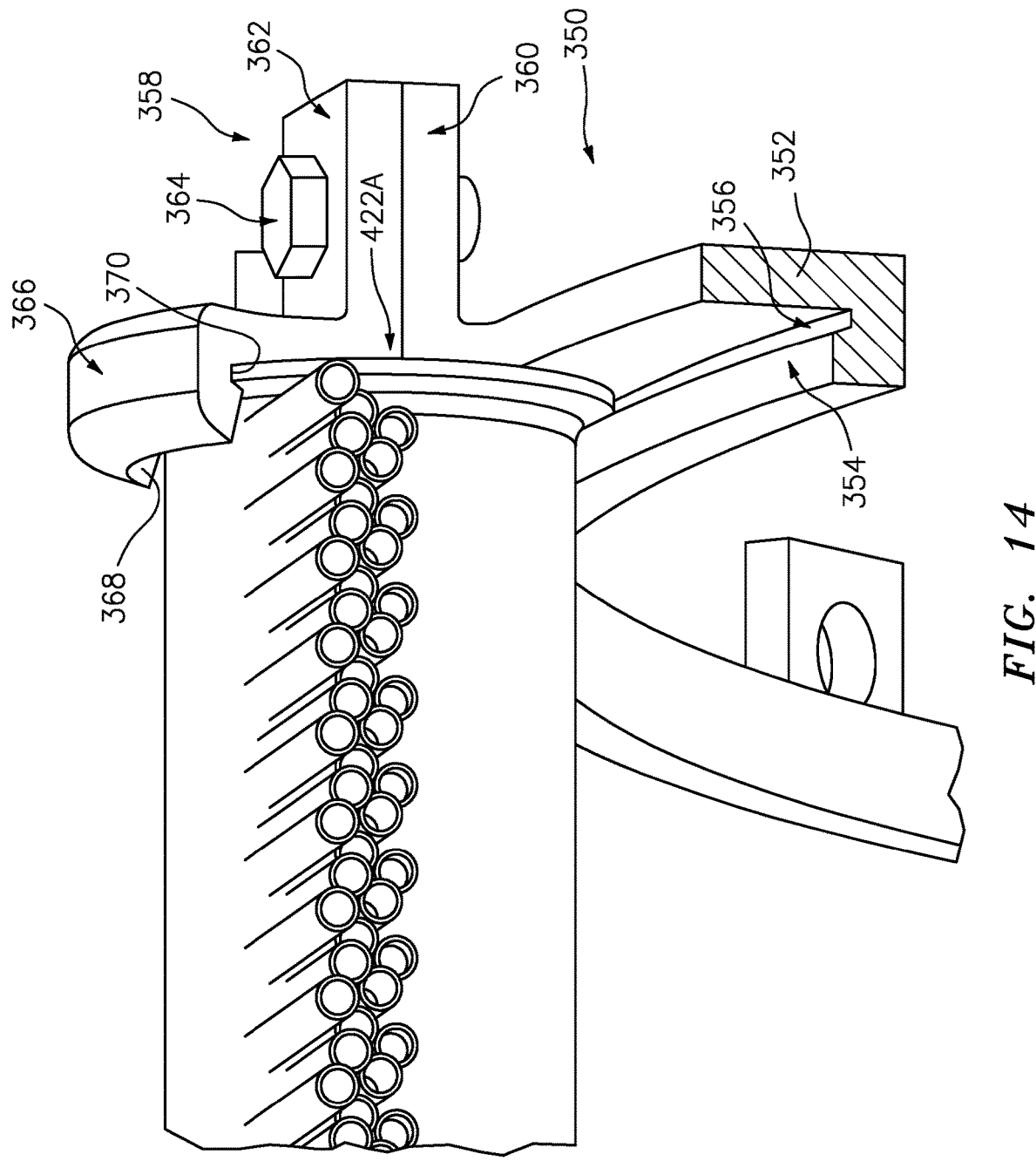
FIG. 14 is a cutaway view of a tube bank adjacent a first end of a second header.

Allowing for modularity, FIG. 12 shows a pre-formed two-bundle tube unit 320 and associated header segments 400, 402. A first header segment 400 is for manufacture of the first header 60 (proximal header or inlet/outlet header) and a second header segment 402 is for manufacture of the second header 62 (distal header or turn header). The segments 400 have open ends 404A, 404B and an interior blockage or barrier 406 (also FIG. 13). In the illustrated embodiment, the blockage may be formed by a plate secured between two tubular sections 408A, 408B. The ends may have flanges 410 for mating to adjacent ends of adjacent units. For example, they may be secured via a V-band clamp 412 (FIG. 13A—shown with band cut away and clamping screw/fastener not shown) capturing the two adjacent flanges. Thus, further such tube units may be assembled to each other in a heat exchanger to add further passes beyond the four-pass, two-unit, example of FIG. 10 while otherwise retaining components such as the manifolds and tie rings.

The flanged ends 404A, 404B are shown as having a sense/sex wherein the exemplary first end 404A is female and the exemplary second end 404B is male. The female end includes an exemplary seal 414 (FIG. 13A) in an inner diameter (ID) rebate; whereas, the male end includes a spigot 416 protruding radially inboard thereof from the flange of the male end to be received in the female end with the seal 414 contacting a junction of the spigot outer surface and flange end surface. Similarly, the fittings of the inlet manifold outlet ports 340A may be male while those of the outlet manifold inlet ports 340B are female.

In distinction, the second segment 402 (FIG. 12) has two closed ends 422A, 422B and an open interior therebetween thus defining a turn of the flowpath through the associated tube unit from one bundle to the next. In the exemplary embodiment, the ends are formed as circular plates secured (e.g., brazed or welded) to ends of a metallic tube 424. Again, peripheral portions of adjacent plates may form flanges secured to each other such as by capture in a V-band clamp. However, in the illustrated configuration, the V-band clamp is only for increased mechanical integrity and not for holding adjacent segments sealed to each other.

The tie rings 350 include a full 360° annulus body 352 (e.g., alloy such as nickel-base superalloy cast or forged). The exemplary body 352 has integral mounting features for mounting the associated distal header end flange. Exemplary features include a full annulus shoulder 354 for contacting an outer diameter surface of the distal header and a channel or groove 356 for capturing the distal header flange (rim portion of end 422A or 422B). To register and hold each distal header, the tie ring 350 includes a clamp 358 mountable to an integral mounting feature 360 of the ring body (e.g., an apertured mounting ear to which a mounting ear 362 of the clamp mounts via a fastener 364 (e.g., a screw threaded into the mounting ear 360)). The exemplary clamp includes an outer diameter (OD) cradle 366 with an inner diameter surface 368 having a groove 370 capturing the flange. Thus, the ring body 352 has a circumferential array of mounting features evenly spaced and corresponding in number to the number of tube banks.

Figure 15:
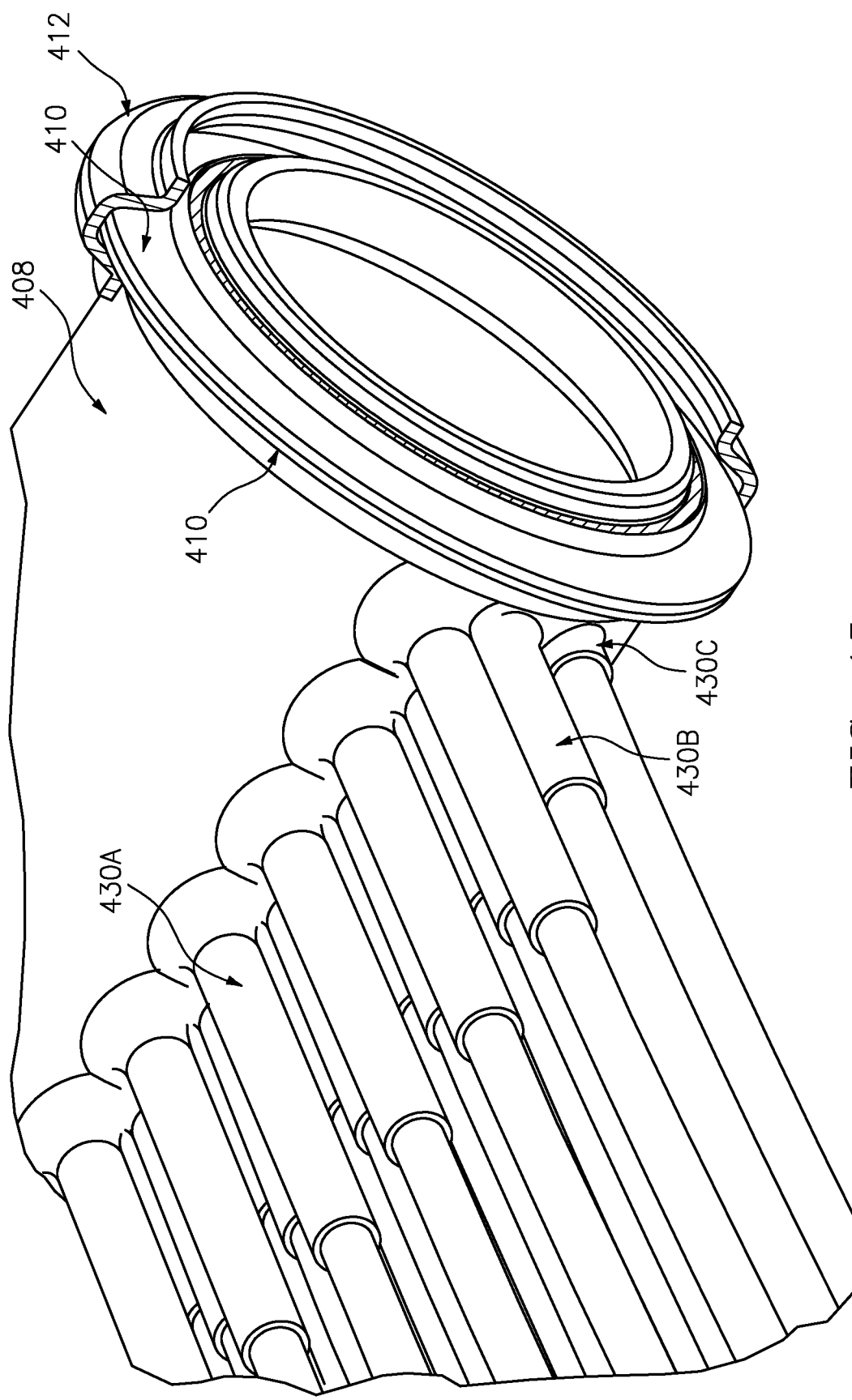
FIG. 15 is a cutaway view of a tube bank adjacent a second end of the first header.

In an exemplary method of manufacture, all tubes 72 are cut to the same length. However, this then requires compensation for slightly different radius of curvature between tubes of the outermost row and tubes of the innermost row. Accordingly, FIG. 15 shows the header segments having tubular bosses 430A, 430B, 430C secured to the associated tubular body 408A, 408B, or 424 and receiving end portions of the associated tubes. From OD to ID relative to the axis 10, the bosses decrease in length allowing the ends of the tubes to be further away from the body from ID to OD.

The heat exchanger may be subject to various differential thermal expansions. One difference is due to different exposure of radial inward tube rows relative to outer rows. This can be accommodated by differential bowing of the various rows. Also, the tube banks may expand and contract differently from the manifolds. This can be accommodated by not rigidly connecting the distal header to the manifolds (except via the tube bundles). For example, differential expansion of the tube bundles relative to the manifolds allows the tie rings to rotate relative to the manifolds.

In the '400 patent, the curvilinear plates separate the axial second flow (the hot exhaust air if used in a recuperator example). In contrast, the tube bundles allow mixed flow around/through a staggered tube array with greater thermal exposure to the first flow in the tubes. If the individual tubes have a circular cross-section, they may better hold high pressure fluids (e.g., compressed air or supercritical $CO_2$). Individual tubes may be made uniformly through an extrusion process, allowing for better structural properties to handle pressure deltas between the inner fluid and outer fluid.

If the individual tubes in in a bundle are all close to the same length, this allows for uniform loss, whereas the arcing turns in the '400 patent will result in the inner tubes being shorter than the outer tubes thus creating uneven loss and potentially uneven heat transfer effects. The difference in radius of curvature of the tubes 72 produces less of a length difference than the '400 patent turn.

The individual tubes allow for metal surface area to be maximized and heat exchanger core weight to be minimized. In particular, extruded tubes may facilitate extremely thin-wall tubes without excess ('400 patent plate) material connecting those tubes.

Relative to both the '400 patent and the '334 publication, the use of tube bundles (particularly with segmented headers 60, 62 creates the possibility of modular constructions allowing for 2, 4, 6, 8, and so forth passes. The more passes, the greater the counter-flow effect and design flexibility to trade fluid pressure loss for heat exchanger effectiveness. The '400 patent with only two passes is particularly inconsistent with the capability to achieve full counterflow effect.

Relative to the '334 publication, the use of a forward-flowing serpentine tube arrangement allows the axial second fluid flow (the hot exhaust in the recuperator example) to continue to flow axially from entrance to exit of the heat exchanger.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbine engine comprising:
a heat exchanger comprising:
an inlet manifold having:
at least one inlet; and
a plurality of outlets;
an outlet manifold having:
at least one outlet; and
a plurality of inlets; and
a plurality of tube banks, each tube bank coupling one of the inlet manifold outlets to an associated one of the outlet manifold inlets, each of the tube banks partially nesting with one or more others of the tube banks,
a gas path passing combustion gas across exteriors of the tube banks,
wherein each of the tube banks comprises:
a first header coupled to the associated inlet manifold outlet and the associated outlet manifold inlet;
a second header; and
a plurality of tube bundles each having a first end coupled to the associated first header and a second end coupled to the associated second header, with a flowpath from the associated inlet manifold outlet passing sequentially through flowpath legs formed by each of the tube bundles in the associated tube bank to exit the tube bank to the associated outlet manifold inlet.

2. The turbine engine of claim 1 wherein:
each first header comprises:
a first end coupled to the associated inlet manifold outlet;
a second end coupled to the associated outlet manifold inlet;
at least one dividing wall between an upstream end of one said leg and a downstream end of the next adjacent downstream leg; and
each second header comprises:
a closed first end;
a closed second end; and
at least one dividing wall between a downstream end of one said leg and an upstream end of the next adjacent upstream leg.

3. The turbine engine of claim 1 wherein:
each tube bank comprises a plurality of modules, each module comprising:
a first header segment having:
an inlet end;
an outlet end; and
a barrier between the inlet end and the outlet end and separating an inlet plenum from an outlet plenum;
a second header segment having:
a closed first end; and
a closed second end;
a first of the tube bundles extending between the inlet plenum and the second header segment; and
a second of the tube bundles extending between the second header segment and the outlet plenum;

the first header segments are secured end-to-end to form the first header; and the second header segments are secured end-to-end to form the second header.

4. The turbine engine of claim 3 wherein:

each said first header segment inlet end and outlet end are flanged;

adjacent first header segment flanges are secured to each other via band clamps;

each said second header segment first end and second end are flanged; and adjacent second header segment flanges are secured to each other via band clamps.

5. The turbine engine of claim 1 further comprising:

a first tie ring structurally connecting first ends of the second headers of the tube banks; and a second tie ring structurally connecting second ends of the second headers of the tube banks.

6. The turbine engine of claim 1 wherein:

the inlet manifold is an arcuate inlet manifold and the outlet manifold is an arcuate outlet manifold; and the arcuate inlet manifold and arcuate outlet manifold each are continuously curving.

7. The turbine engine of claim 1 wherein:

the inlet manifold is an arcuate inlet manifold and the outlet manifold is an arcuate outlet manifold; and the arcuate inlet manifold and arcuate outlet manifold extend 300° to 360° about a central axis.

8. The turbine engine of claim 1 wherein:

the inlet manifold is an arcuate inlet manifold and the outlet manifold is an arcuate outlet manifold; and the arcuate inlet manifold and arcuate outlet manifold taper in transverse internal cross section away from the respective inlet manifold inlet and outlet manifold outlet.

9. The turbine engine of claim 1 wherein:

the plurality of tube banks is at least 4 tube banks.

10. The turbine engine of claim 1 wherein:

each of the tube banks nests with at least four others of the tube banks.

11. The turbine engine of claim 1 wherein:

each of the tube banks circumferentially partially or completely overlaps at least four others of the tube banks.

12. The turbine engine of claim 1 wherein:

each of the tube banks circumferentially overlaps at least four others of the tube banks at a given circumferential location.

13. The turbine engine of claim 1 wherein:

each of the tube banks comprises at least four said tube bundles.

14. The turbine engine of claim 13 wherein:

each of the tube banks comprises four to eight said tube bundles; and each of the tube bundles comprises at least 20 tubes.

15. The turbine engine of claim 14 wherein:

the tubes in each of the tube bundles are arranged in a two dimensional array.

16. The turbine engine of claim 1 wherein:

the tubes of the tube banks are arcuate.

17. The turbine engine of claim 1 wherein:

the tubes of the tube banks are continuously curving arcuate.

18. The turbine engine of claim 1 wherein:

the tubes of the tube banks are of circular cross-section.

19. The turbine engine of claim 1 further comprising:

a recuperator comprising:

a turbine coupled to the at least one outlet of the outlet manifold; and a compressor having an outlet coupled to the at least one inlet of the inlet manifold.

20. The turbine engine of claim 19 wherein:

the recuperator comprises a generator driven by the turbine; and the recuperator comprises a supercritical carbon dioxide or other cryogenic working fluid.

* * * * *